(12) United States Patent
Fell et al.

(10) Patent No.: US 9,671,422 B2
(45) Date of Patent: Jun. 6, 2017

(54) VIBRATORY RING STRUCTURE

(71) Applicant: Atlantic Inertial Systems Limited, Plymouth (GB)

(72) Inventors: Christopher Paul Fell, Dublin (IE); Rebecka Eley, Plymouth (GB)

(73) Assignee: Atlantic Inertial Systems Limited, Devon (GB)

( * ) Notice: Subject to any disclaimer, the term of this patent is extended or adjusted under 35 U.S.C. 154(b) by 279 days.

(21) Appl. No.: 14/386,477

(22) PCT Filed: Mar. 13, 2013

(86) PCT No.: PCT/GB2013/050615
§ 371 (c)(1),
(2) Date: Sep. 19, 2014

(87) PCT Pub. No.: WO2013/140134
PCT Pub. Date: Sep. 26, 2013

(65) Prior Publication Data
US 2015/0040663 A1  Feb. 12, 2015

(30) Foreign Application Priority Data
Mar. 22, 2012 (GB) .................................. 1205014.2

(51) Int. Cl.
G01C 19/56 (2012.01)
G01P 15/125 (2006.01)
G01C 19/5684 (2012.01)
G01P 15/14 (2013.01)

(52) U.S. Cl.
CPC ........ G01P 15/125 (2013.01); G01C 19/5684 (2013.01); G01P 15/14 (2013.01)

(58) Field of Classification Search
CPC .................................................. G01C 19/5684
USPC ....................................... 73/504.13
See application file for complete search history.

(56) References Cited

U.S. PATENT DOCUMENTS

| 5,760,304 | A | | 6/1998 | Lynch | |
|---|---|---|---|---|---|
| 5,872,313 | A | * | 2/1999 | Zarabadi | G01C 19/5684 73/504.12 |
| 5,889,207 | A | * | 3/1999 | Lutz | G01C 19/5684 73/504.13 |
| 6,244,111 | B1 | * | 6/2001 | Funk | G01C 9/00 73/504.13 |

(Continued)

FOREIGN PATENT DOCUMENTS

| EP | 1775551 | 4/2007 |
|---|---|---|
| JP | 07091955 | 4/1995 |

(Continued)

OTHER PUBLICATIONS

Search Report dated Jul. 13, 2012 in UK Application No. GB1205014.2.

(Continued)

*Primary Examiner* — John Chapman, Jr.
(74) *Attorney, Agent, or Firm* — Snell & Wilmer L.L.P.

(57) ABSTRACT

A vibratory ring structure is described which comprises a ring body and at least one ring electrode secured thereto, the or each ring electrode extending over a first angular extent and: being attached to the ring body over second angular extent, wherein the first angular extent is greater than the second angular extent.

15 Claims, 3 Drawing Sheets

(56) References Cited

U.S. PATENT DOCUMENTS

| | | |
|---|---|---|
| 2005/0036726 A1 | 2/2005 | Lee et al. |
| 2010/0212424 A1 | 8/2010 | Malvern et al. |
| 2010/0218606 A1 | 9/2010 | Fell |

FOREIGN PATENT DOCUMENTS

| | | |
|---|---|---|
| JP | 08068638 | 3/1996 |
| JP | H1047972 | 2/1998 |
| JP | H11513111 | 11/1999 |
| JP | 2003530540 | 10/2003 |
| JP | 4571943 | 10/2010 |

OTHER PUBLICATIONS

International Search Report and Written Opinion dated Jun. 10, 2013 in PCT Application No. PCT/GB2013/050615.
Office Action dated Jan. 23, 2017 in Japanese Application No. 2015-500978.

\* cited by examiner

VIBRATORY RING STRUCTURE

CROSS-REFERENCE TO RELATED APPLICATIONS

This application is U.S. national phase filing under 35 U.S.C. §371 of PCT/GB2013/050615 filed on Mar. 13, 2013, and claims priority from United Kingdom Application No. GB 1205014.2 which was filed on Mar. 22, 2012, both of which are incorporated herein by reference.

This invention relates to a vibratory ring structure. In particular it relates to a structure suitable for use as the vibratory ring structure of a gyroscope with capacitive transduction.

An example of device which utilises a vibratory ring structure is the ring gyroscope described in EP1775551. Such a device is formed using MEMS techniques, and operates using a cos 2θ in-plane flexural mode pair. The ring is driven and sensed using capacitive transduction in which fixed electrodes are positioned close to the structure of the ring. The mutual capacitance between the ring structure and the fixed electrodes results in capacitive coupling which may be used to exert a force on the ring structure or to detect a displacement or velocity of the ring structure. The gyroscope of EP1775551 operates as an angular rate sensor, but rate integrating vibratory gyroscopes are also known. It will be appreciated that vibratory ring structures may be used in other devices, and that gyroscopes are merely one application for such a structure. US2005/0036726 describes an arrangement in which a ring structure is supported from above and beneath by supporting legs which are out of the plane of the ring structure. JP08068638 and JP7091955 each describe an arrangement in which a piezoelectric ring structure carries, on its outer surface, drive electrodes. WO2011/013429 describes a ring structure with piezoelectric transducers mounted upon the upper surface of the ring structure.

Charging is a known phenomenon in MEMS devices, in which charge accumulates within non-conducting layers of the device. In silicon MEMS structures in which highly doped silicon is used as a capacitive electrode, a dielectric native silicon oxide layer will typically be formed at the surface. Further dielectric layers may also be grown or deposited on the surface. When an electrical field is applied across a dielectric layer, charge may accumulate in traps within the dielectric layer. MEMS devices with capacitive transduction typically employ relatively high electrical fields, and dielectric materials within the field may thereby become charged. As charge traps become filled, charge will accumulate and will eventually reach a steady state. When the field is removed, the charges will dissipate from the charge traps, typically at a much lower rate than the initial charging, which was accelerated by the presence of the high electrical field. It may, for instance, take a number of hours for charge within a dielectric to dissipate, compared with a number of seconds for it to build up.

Charge built up on a dielectric layer between two conductors has the effect of modifying the effective bias voltage between the conductors. For a capacitive pickoff transducer in which a fixed bias is employed between a moving electrode and a fixed electrode, the effect of such charging will typically be to reduce the effective voltage bias between the conductors of the transducer. The displacement current resulting from relative movement of two electrodes at a fixed voltage bias is proportional to the voltage bias. A change in the voltage bias therefore results in a change in the sensitivity of a capacitive transducer. Similarly, the skilled person will appreciate that the force from a capacitive transducer is related to the effective bias voltage, which may be affected by charging.

Due to process variations or material imperfections, the distribution of charge trapping across a MEMS device may vary, resulting in a non-uniform distribution of charge after the application of an electrical field. A non-uniform charge distribution may thereby occur between two conductors of a capacitive transducer.

In the case of the MEMS gyroscope described in EP1775551, the secondary pickoff transducer may extend over an angular extent of approximately 40 degrees. A variation in trapped charge density over the surface of either electrode of the secondary pickoff transducer may result in a variation in the sensitivity of the pickoff transducer over its extent. This may have the effect of changing the effective alignment of the pickoff transducer sensor with respect to the ring structure, which may make the secondary pickoff transducer sensitive to the primary mode. Similarly, a variation in the charge density may result in a change in the effective alignment of the primary drive transducer with respect to the electrode.

It will be appreciated that, in the device of EP1775551, it is important for the primary and secondary transducers to be at a 45 degree offset from one another, so that the secondary transducer is not sensitive to the primary vibrational mode excited by the primary transducer. Any misalignment, for example as mentioned hereinbefore, results in the secondary transducer being sensitive to the primary mode, resulting in increased rate bias.

A vibratory ring structure which avoids the potential for misalignment of the pickoff transducers resulting from non-uniform charge trapping is therefore desirable.

In addition, it has been noted that the performance of capacitive ring gyroscopes is maximised when the capacitive coupling of the transducers is maximised. One method by which this may be achieved is by maximising the change in capacitance between the fixed electrodes and the ring structure in the primary and secondary modes of vibration. The space available around the ring structure limits the area over which the displacement may be sensed. Furthermore, increasing the circumferential extent of the fixed electrodes may result in diminishing returns, since the radial displacement of the ring in the primary or secondary mode varies with the circumferential location, and regions remote from a vibrational anti-node therefore have a reduced radial displacement. Increasing the radial extent of the fixed electrodes tends to increase the total capacitance in proportion to the increase in radial extent, whereas the change in capacitance for each extra increment of radial extent tends to decrease.

There is a desire to provide a vibratory ring structure which is of relatively low sensitivity to non-uniform charge trapping and which enables improved capacitive coupling between the ring structure and adjacent fixed electrodes. It is further desirable that the ring structure is as small as possible, and so a ring structure which addresses these problems without substantially increasing size is therefore desirable. Such an improved ring structure may be used in angular rate sensors with improved performance, for example improved bias performance and shock stability.

According to the present invention, there is a vibratory ring structure comprising a ring body and at least one ring capacitive electrode secured thereto, the or each ring electrode extending over a first angular extent of the ring body and being attached to the ring body over second angular extent of the ring body, wherein the first angular extent is greater than the second angular extent.

Such an arrangement is advantageous in that the entire ring electrode will move, substantially radially, by the same distance, in use, maintaining a substantially uniform spacing from an associated fixed electrode along its full length, and so capacitive coupling can be enhanced.

The at least one ring electrode preferably has its second angular extent centred on an anti-node of an in-plane flexural vibrational mode of the ring structure.

The ring electrode is preferably secured to the ring body by an attachment member, the width of the attachment member defining the second angular extent. The attachment member is conveniently integral with the ring body and the ring electrode.

Preferably, the ring structure further comprises a suspension means including a ligament secured to the ring body at a location that is radially aligned with the attachment member.

Conveniently, the ring electrode is disposed radially outwards of the ring body.

Preferably, the first angular extent is at least five times greater than the second angular extent.

The at least one ring electrode may have a resonant frequency which is at least twice that of the vibrational mode of the ring structure so that the ring electrode is substantially free from deformation in the vibrational mode of the ring structure.

The ring structure may have a primary and a secondary in-plane flexural vibrational mode, with angular movement of the ring structure about the ring axis resulting in Coriolis coupling between the primary and secondary modes, wherein the at least one ring electrode comprises at least one primary ring electrode whose second angular extent is centred on an anti-node of the primary mode, and at least one secondary ring electrode whose second angular extent is centred on an anti-node of the secondary mode.

The structure preferably further comprises a fixed electrode associated with each ring electrode, each pair of fixed and ring electrodes defining a capacitive transducer. Such an arrangement lends itself to use as a gyroscope. According to another aspect of the invention, therefore, there is provided a gyroscope comprising a structure of the type defined hereinbefore, a primary driving means that initiates and maintains the primary mode of vibration and a secondary detecting means that detects the second mode of vibration, wherein the primary driving means and/or the secondary detecting means comprises a ring electrode of the structure and corresponding fixed electrode.

The gyroscope may further comprise a primary detecting means that detects the primary vibrational mode, and secondary driving means that nulls the secondary vibrational mode, wherein the primary detecting means and/or the secondary driving means comprises a ring electrode and corresponding fixed electrode.

The invention will further be described, by way of example, with reference to the accompanying drawings, in which.

Figure 1:
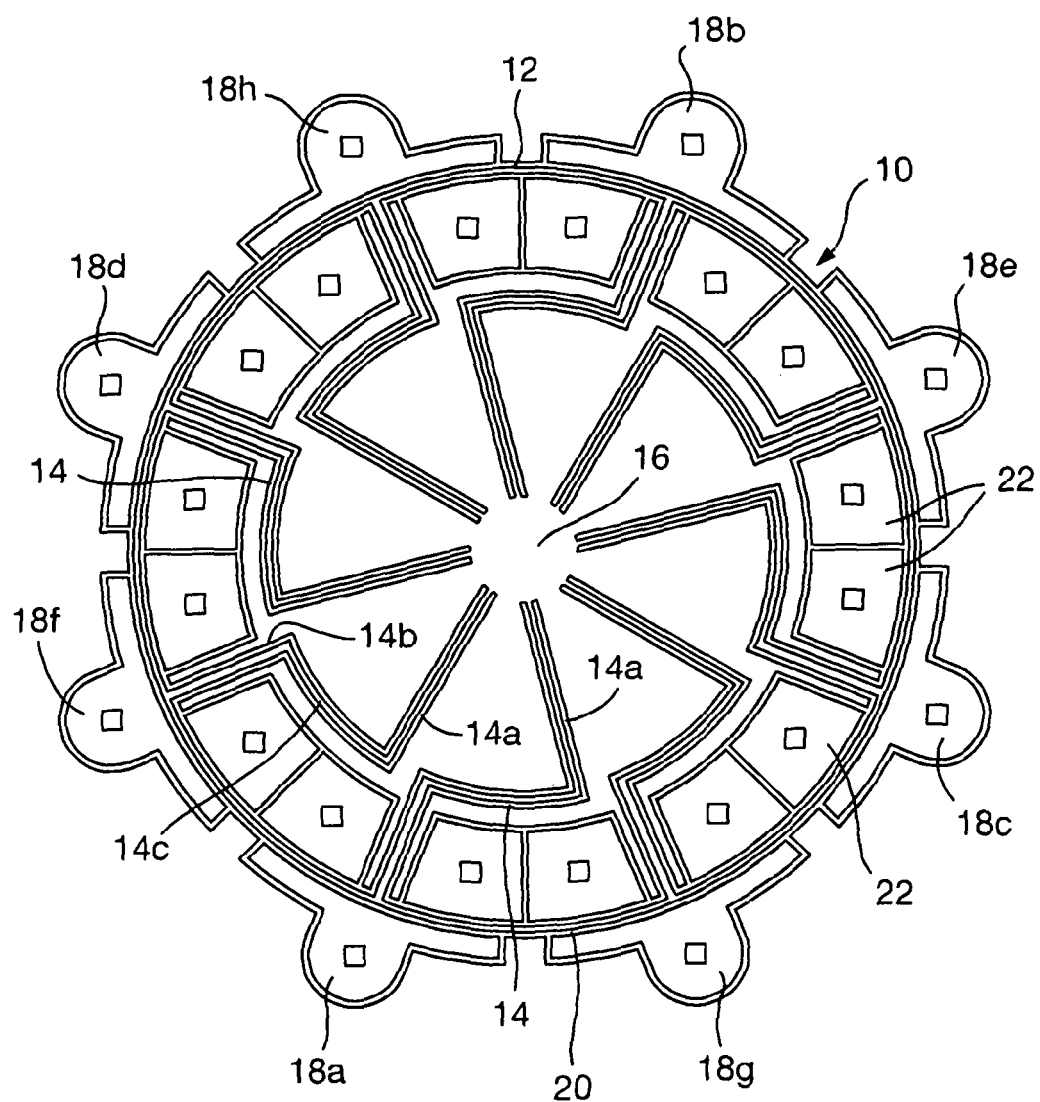
FIG. 1 is a schematic plan view of a known angular rate sensor.

Referring firstly to FIG. 1, a known vibratory ring structure 10 is shown, comprising a ring portion or body 12, which is mounted on and supported by eight suspension ligaments 14 whereby the body 12 is connected to and supported by a central fixed anchor 16. The suspension ligaments 14 are substantially equi-angularly spaced apart from one another around the ring body 12, and each ligament 14 comprises a pair of radially extending portions 14*a*, 14*b* interconnected by an arcuate portion 14*c*.

Eight outer fixed electrodes 18, are disposed radially outwards of the ring body 12 and adjacent thereto, the fixed electrodes 18 being substantially equi-angularly spaced around the body 12. Each fixed electrode 18 is separated from the adjacent part of the ring body 12 by part of a trench 20 of uniform width, the trench defining a gap or space between the substantially parallel and vertical adjacent faces of each outer fixed electrode 18 and the adjacent part of the ring body 12. The external, facing surfaces of the ring body 12 and the fixed electrodes 18 are arranged to be electrically conductive, and the adjacent faces of the ring body 12 and fixed electrodes 18 thereby form variable capacitors which may be used to sense the position and/or velocity of the ring body 12, to exert an electrostatic force to drive oscillations in the ring body 12, and/or to tune the frequencies of the modes of the ring body 12.

In the known gyroscope of FIG. 1, the fixed electrodes identified by numerals 18*a* and 18*b* may be used to drive a primary cos 2θ mode, with fixed electrodes 18*c* and 18*d* being used to detect the amplitude of the primary mode. Similarly, fixed electrodes 18*e* and 18*f* may be used to detect the secondary mode, and fixed electrodes 18*g* and 18*h* may be used to null the secondary mode.

Each of the fixed electrodes 18 extends over an angular extent of, say, approximately 40 degrees. Each of the electrodes 18 is centred on an anti-node of the primary mode (in the case of electrodes 18*a*, 18*b*, 18*c* and 18*d*) or the secondary mode (in the case of the electrodes 18*e*, 18*f*, 18*g* and 18*h*). For example, the fixed electrode 18*b* may be centred on an anti-node of the primary node. Conveniently, at the centre of the fixed electrode 18*b*, the ring body 12 has a normalised radial modal displacement for the primary mode of 1, but the regions of the ring body 12 which are remote therefrom, for example adjacent to the ends of the fixed electrode 18*b*, have a reduced radial modal displacement. By way of example, at the ends of the fixed electrode 18*b* the normalised displacement may be just 0.77 of the maximum (cos (2*20 degrees)). Regions of the ring body 12 which are remote from mode anti-nodes therefore have a decreased sensitivity to the mode, in proportion to their area, than the regions of the ring body 12 which are located at an anti-node. Angular misalignment of the fixed electrode 18 with respect to the ring body 12 will affect the effective centre position of the electrode 18.

One source of bias error is angular misalignment between the primary drive 18*a*, 18*b* and the secondary pickoff 18*e*, 18*f*. As discussed previously, such misalignment may occur as a result of non-uniform charge trapping resulting in a variation in effective bias voltage across the extent of the transducers. The effective position of each fixed electrode 18 is set by the effective electrical centre of the variable capacitor formed between the fixed electrode and ring body, and angular misalignment may arise as a result of the effective electrical centre of the variable capacitor being offset from the physical centre of the fixed electrode.

It will be appreciated that the cos 2θ modes of the ring structure 10 are nominally degenerate and in the absence of any manufacturing defects, the ring therefore effectively supports cos 2θ modes of equal frequency at any orientation with respect to the ring axis. The skilled person will appreciate that the eightfold symmetry of the suspension ligaments 14 means that they nominally have no effect on the degeneracy of the cos 2θ modes. The specific angular location of the fixed electrodes 18 with respect to the ring 10 and the suspension ligaments 14 thereof is therefore relatively arbitrary. In practice, however, the ring body 12 is not free from manufacturing defects, and tuning means may be employed to minimise the frequency split between the primary and secondary mode. The gyroscope of EP1775551 includes further fixed electrodes 22 which are disposed radially inwards of the ring body 12. These tuning electrodes 22 can be used to modify the effective stiffness of the primary and secondary modes by applying appropriate voltage biases between the tuning electrodes 22 and the ring structure 10.

Figure 2:
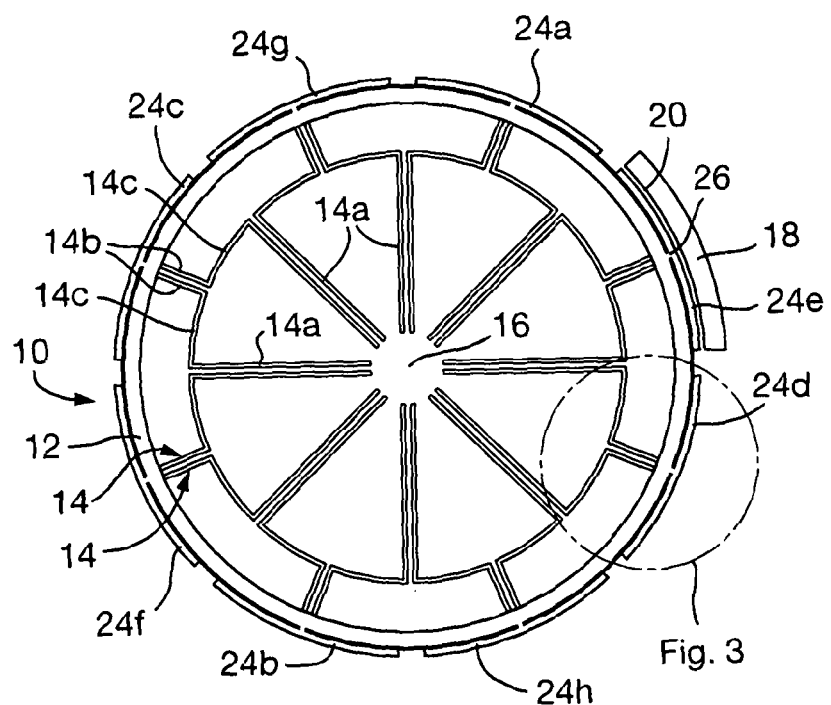
FIG. 2 is a schematic view illustrating a vibratory ring structure in accordance with an embodiment of the invention.

FIG. 2 shows a vibratory ring structure 10 according to an embodiment of the invention. The ring structure 10 comprises a ring portion or body 12 which is attached to a central anchor 16 by eight suspension means. Each suspension means comprises a pair of suspension ligaments 14. As with the arrangement of FIG. 1, each suspension ligament 14 comprises a pair of radially extending portion 14a, 14b interconnected by an arcuate section 14c. The portion 14a of each pair of ligaments 14 extend parallel and adjacent one another, and each portion 14b lies parallel and adjacent a portion 14b of a ligament 14 of another of the pairs.

The ring structure 10 further comprises ring electrodes 24a to 24h. The ring electrodes 24 are substantially equi-angularly spaced around the circumference of the ring body 12, and are each of substantially the same arcuate shape and size. Each of the ring electrodes 24 extends over a first angular extent θ about the axis of the ring structure 10, and is attached to the ring body by an attachment member 26 formed integrally with associated electrode 24. The attachment members 26 each extend over a second angular extent β which is smaller than the first angular extent θ. In the example embodiment of FIG. 2, the angle θ subtended by each electrode 24 at the centre of the ring structure is approximately 36 degrees, whereas the angle β subtended by the attachment member 26 where it joins the associated ring electrode 24 to the ring body 10 is approximately 1 degree.

Figure 3:
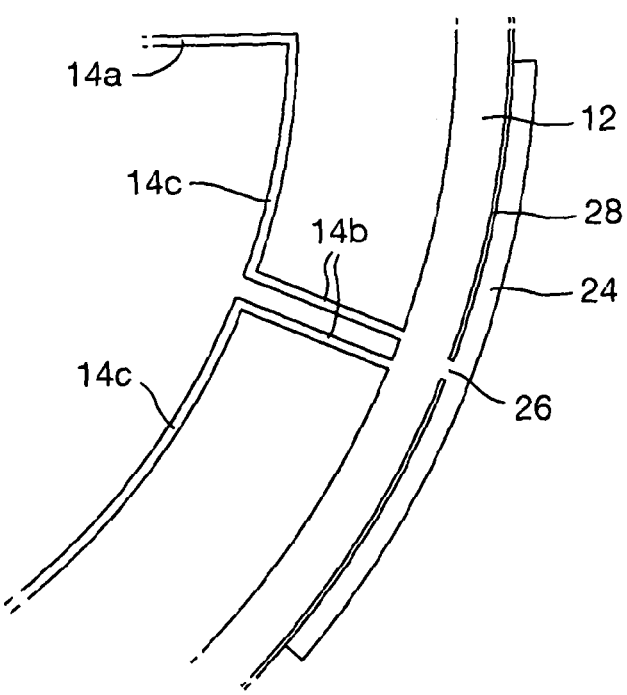
FIG. 3 is an enlargement of part of FIG. 2.

As can be seen most clearly in FIG. 3, the ring electrode 24d is of arcuate shape and is concentric with the ring body 12. A small, substantially uniform width gap 28 spaces the ring electrode 24d and the ring body 12. The attachment member 26, which is formed integrally with the ring body 12 and the electrode 24d extends across the gap 28 and secures the ring electrode 24d to the ring body 12. The ring electrode 24d is of substantially uniform width and so an outer face thereof is also substantially concentric with the ring body 12.

Whilst FIG. 3 only illustrates one of the ring electrodes 24d, it will be appreciated that the other ring electrodes are substantially identical thereto.

In use, the ring structure 10 is located within a series of fixed electrodes 18, each fixed electrode 18 being located adjacent a respective one of the ring electrodes 24. In FIG. 2, just one of the fixed electrodes 18 is shown.

When the ring structure 10 is vibrating in a primary cos 2θ mode with an anti-node coincident with the centre of one of the ring electrodes, the entire ring electrode 24 will move with the maximum normalised radial displacement magnitude of 1, thereby enabling improved capacitive coupling with the adjacent fixed electrode 18. In contrast, as mentioned hereinbefore, with reference to FIG. 1, in known arrangements only a small part of the movable 'electrode' formed by the part of the ring body adjacent the fixed electrode would move by the maximum radial displacement, the majority of the 'electrode' moving by a reduced displacement related to the distance from the anti node. Furthermore, any non-uniform charge distribution over the ring electrode 24 or the associated fixed electrode will not result in a change in the effective centre of the transducer, since this is determined by the location of the attachment member 26.

Each ring electrode 24 approximates two cantilevers, each fixed at their base to the ring body 12 by the associated attachment member 26. If these cantilevers have a resonant frequency that is similar to that of the cos 2θ mode of the ring structure 10 they will tend to participate in the cos 2θ mode, and the radial modal magnitude along the ring electrode 24d may vary. It is preferable that this does not occur, and each ring electrode 24 may therefore designed with a relatively high stiffness (and/or low mass) so that its resonant frequency is higher than that of the cos 2θ modes of the ring structure 10. The resonant frequency of each ring electrode 24 may be at least twice that of the flexural ring mode.

The eightfold symmetry of the ring electrodes 24, in combination with their narrow or point attachment to the ring body 12 by the associated attachment members 26 means that their mass loading effect nominally has no effect on the degeneracy of the cos 2θ mode. In the example embodiment of FIG. 2 each ring electrode 24 is attached on the same radius as the corresponding suspension means, but on the outside of the ring body 12 whilst the suspension means are connected on the inside of the ring body 12. The point mass loading of the ring electrodes 24 will therefore tend to cancel the stiffness loading of the ring by the suspension ligaments 14, which may reduce second order effects from the suspension means and/or ring electrodes 24 that may act to prevent cos 2θ mode degeneracy. The effective mass contribution of the ring electrodes 24 in the cos 2θ mode may be selected to cancel the contribution of the suspension means to the effective stiffness in the cos 2θ mode.

Whilst it may be advantageous for the suspension means and the ring electrodes 24 to be radially aligned, this is not an essential feature and the ring structure suspension ligaments 14 may be attached to the ring body 12 elsewhere, for instance in the regions between the ring electrodes 24.

In use, the ring electrodes associated with anti-nodes of the secondary mode 24e, 24f, 24g, 24h will tilt, slightly, about their point of attachment 26 with the ring structure in the primary mode of vibration. However, this tilting does not affect the effective electrical position of the centre of the electrodes 24e, 24l, 24g, 24h. The angular position of each electrode 24 is thus better defined by the point of attachment 26 to the ring body 12, since the force applied by the primary and secondary drive capacitive transducers is applied to the ring body 12 at the point of attachment 26. Similarly, the angular position of the primary and secondary detector capacitive transducers is better defined, since they are responsive to the radial movement of the ring body 12 at each point of attachment 26, rather than to an integral function of the radial movement of the ring body 12 within a region that is adjacent to the fixed electrode 24.

A non-uniform distribution of charge on either of the ring body 12 or a fixed electrode 24 does not affect the effective centre of the transducer comprising the fixed electrode 24. Instead, the total trapped charge will simply modify the sensitivity of the transducer by changing the effective bias voltage. This improved definition of the angular position of the capacitive transducers leads to improved bias performance by reducing the effect of misalignment errors as described hereinbefore. An angular rate sensor comprising ring electrodes according to an embodiment of the invention therefore has improved performance over prior art devices.

Furthermore under shock, the ring structure 10 tends to displace on the suspension means, without substantially deforming the ring body 12. A gyroscope according to an embodiment of the invention in which matched pairs of transducers comprising ring electrodes on opposite sides of the ring are used for primary and secondary drive and detection is relatively insensitive to such shock translation of the ring. The linear translation of the ring body 12 does not affect the effective centre of each electrode.

A gyroscope according to an embodiment of the present invention will have improved capacitive coupling, and therefore a higher signal level at capacitive transducers comprising a ring electrode. Furthermore, the angular effective position of capacitive transducers comprising a ring electrode is insensitive to non-uniform charge distribution, which can be used to provide a gyroscope with improved rate bias performance.

Figure 4:
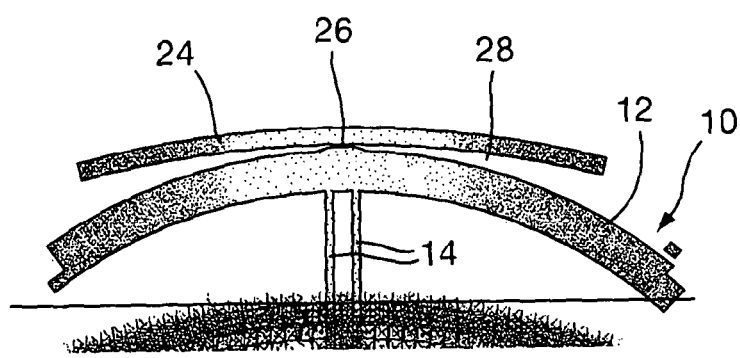
FIG. 4 is a modal analysis diagram of an embodiment of the invention.

Referring next to FIG. 4, the results of a modal analysis of an embodiment of the invention are shown. It will be appreciated that the ring structure is depicted with a greatly exaggerated modal displacement to clearly show the shape of the mode. As is clear from FIG. 4, the radial modal displacement of the ring electrode 24 is substantially constant over the full extent of the ring electrode 24, in contrast to the variable radial modal displacement magnitude of the ring body 12 over the same angular extent, and the corresponding variable displacement of the ring electrode as would occur in the arrangement of FIG. 1.

The ring electrodes 24 may comprise a conducting material. Where the ring electrodes 24 are coated in the conducting material (for instance aluminium), or consist of conducting material (for instance highly doped silicon) it is convenient for the electrodes of the ring structure to be electrically interconnected, for instance being at a common voltage in use. Alternatively, a conducting track may be disposed on an insulating surface of each ring electrode, the track running along the outer edge thereof. In this case, each ring electrode 24 or group of opposite ring electrodes 24*a*, 24*b* may be individually addressable so that independent voltages may thereby be applied.

Although an arrangement has been described in which each of the ring electrodes is the same size and shape, ring electrodes of varying sizes and shapes are contemplated within the scope of the invention.

Although an arrangement has been depicted which is particularly suitable for use as part of a gyroscope, it will be appreciated that a ring electrode on a vibratory ring structure according to an embodiment of the invention may be used to improve capacitive coupling between an adjacent fixed electrode and the vibrational modes of the ring in any device employing a vibratory ring structure. An embodiment employing a single ring electrode is therefore contemplated.

A number of suitable arrangements for drive and detection of primary and secondary modes can be used with the ring electrodes of the present invention, including open loop operation and closed loop operation as described in EP1775551. As these techniques are well known, they will not be described in further detail herein.

A number of other modifications and alterations may be made to the arrangements described herein without departing from the scope of the invention, as defined in the appended claims.

What is claimed is:

1. A vibratory ring structure comprising a ring body and at least one ring capacitive electrode secured thereto, the at least one ring electrode extending over a first angular extent of the ring body and being attached to the ring body over a second angular extent of the ring body, wherein the first angular extent is greater than the second angular extent, wherein the at least one ring capacitive electrode is concentric with the ring body, and the at least one ring electrode is configured to at least one of drive and detect a radial displacement of the ring body.

2. The vibratory ring structure according to claim 1, wherein the at least one ring electrode has the second angular extent centered on an anti-node of an in-plane flexural vibrational mode of the ring structure.

3. The vibratory ring structure according to claim 1, wherein the ring electrode is secured to the ring body by an attachment member, the width of the attachment member defining the second angular extent.

4. The vibratory ring structure according to claim 3, wherein the ring structure further comprises a suspension means including a ligament secured to the ring body at a location that is radially aligned with the attachment member.

5. The vibratory ring structure according to claim 1, wherein the ring electrode is disposed radially outwards of the ring body.

6. The vibratory ring structure according to claim 1, wherein the at least one ring electrode has a resonant frequency which is at least twice that of the vibrational mode of the ring structure so that the ring electrode is substantially free from deformation in the vibrational mode of the ring structure.

7. The vibratory ring structure according to claim 1, wherein the ring structure has a primary and a secondary in-plane flexural vibrational mode, with angular movement of the ring structure about the ring axis resulting in Coriolis coupling between the primary and secondary modes; wherein the at least one ring electrode comprises at least one primary ring electrode whose second angular extent is centered on an anti-node of the primary mode, and at least one secondary ring electrode whose second angular extent is centered on an anti-node of the secondary mode.

8. The vibratory ring structure according to claim 1, wherein the first angular extent is at least five times greater than the second angular extent.

9. The vibratory ring structure according to claim 1, further comprising a fixed electrode associated with each ring electrode, each pair of fixed and ring electrodes defining a capacitive transducer.

10. The vibratory ring structure according to claim 9, wherein the at least one ring electrode is disposed between the ring body and the corresponding fixed electrode, the corresponding fixed electrode being concentric with the ring body.

11. The vibratory ring structure according to claim 10, wherein the fixed electrode spans the second angular extent.

12. A gyroscope comprising the structure according to claim 1, and further comprising a primary driving means that initiates and maintains the primary mode of vibration and a secondary detecting means that detects the second mode of vibration, wherein the primary driving means and/or the secondary detecting means comprises a ring electrode and corresponding fixed electrode.

13. A gyroscope according to claim 12, further comprising a primary detecting means that detects the primary vibrational mode, and secondary driving means that nulls the secondary vibrational mode, wherein the primary detecting means and/or the secondary driving means comprises a ring electrode and corresponding fixed electrode.

14. The vibratory ring structure according to claim 1, wherein the at least one ring capacitive electrode comprises an arcuate geometry.

15. The vibratory ring structure according to claim 1, wherein a substantially uniform width gap spaces the ring body and the at least one ring capacitive electrode.

* * * * *